UNITED STATES PATENT OFFICE.

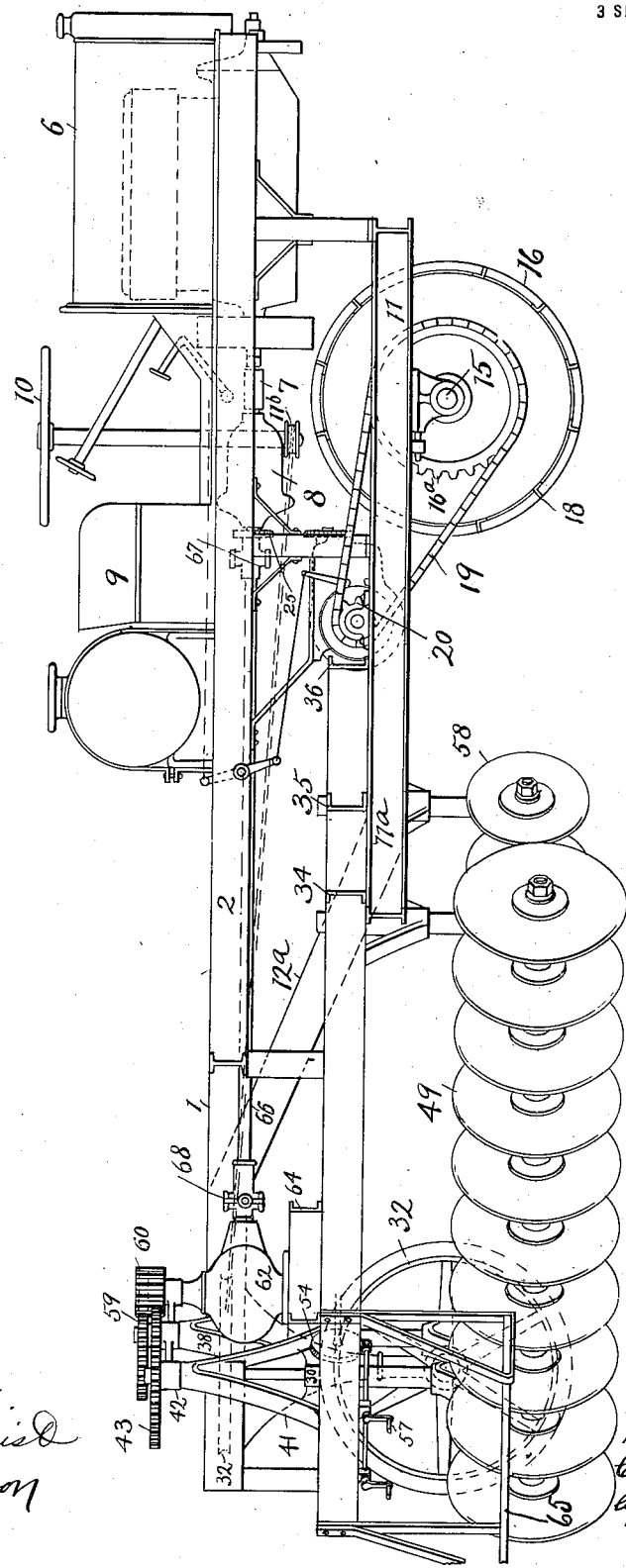

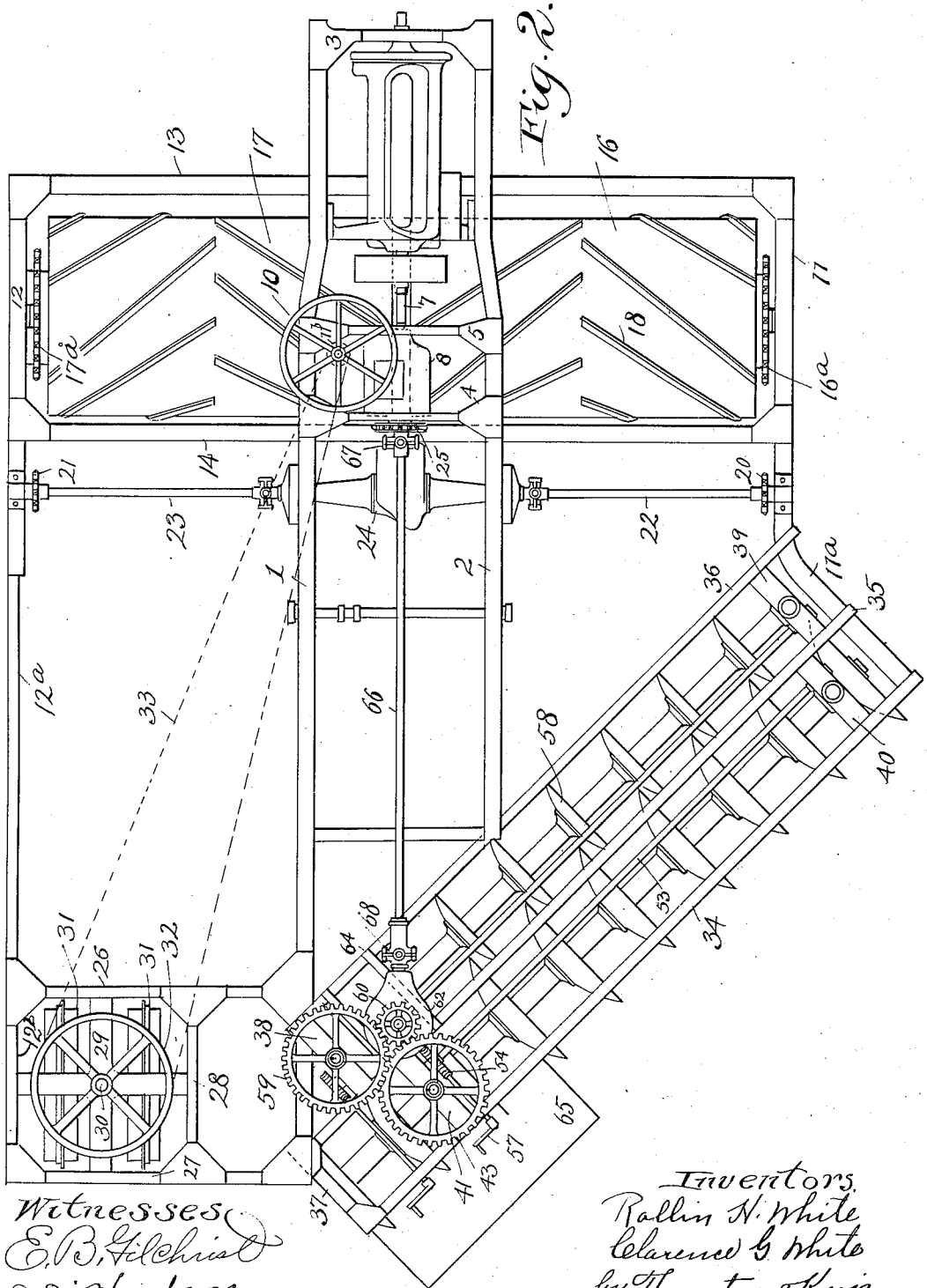

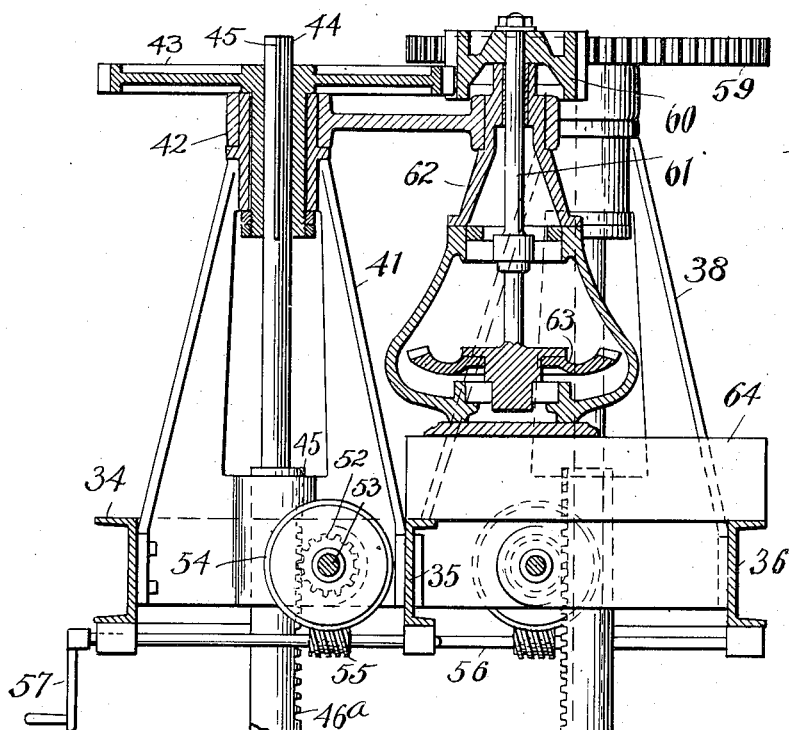
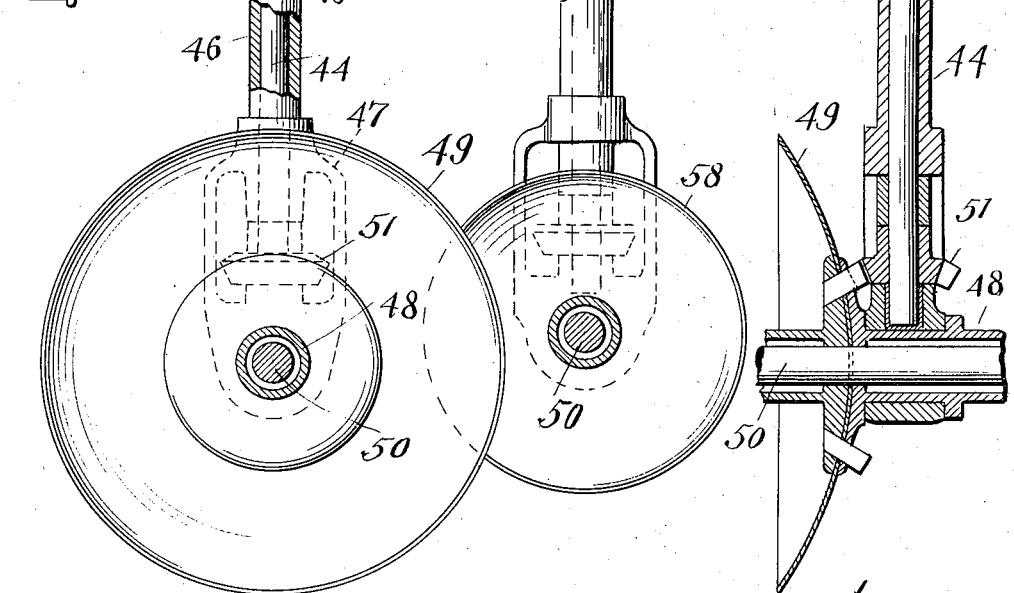

ROLLIN H. WHITE, OF CLEVELAND HEIGHTS VILLAGE, OHIO, AND CLARENCE G. WHITE, OF HAIKU, TERRITORY OF HAWAII.

AGRICULTURAL MACHINE.

1,170,202.   Specification of Letters Patent.   Patented Feb. 1, 1916.

Application filed March 31, 1913. Serial No. 757,765.

*To all whom it may concern:*

Be it known that we, ROLLIN H. WHITE and CLARENCE G. WHITE, citizens of the United States, and residents, respectively, of Cleveland Heights village, in the county of Cuyahoga and State of Ohio, and Haiku, Maui, Territory of Hawaii, have invented a certain new and useful Improvement in Agricultural Machines, of which the following is a full, clear, and exact description.

This invention relates to self propelled agricultural machinery, the object being to provide as a unitary structure a chassis carrying a power plant and also carrying implements which work upon the soil.

In the present instance, the agricultural machine shown is a self propelled disk harrow plow, although the particular construction shown is only by way of disclosure, and it is not intended to limit the invention to the precise form of machine shown, except wherein the claims shall so specify.

Generally speaking, the invention comprises the elements and combinations thereof set forth in the accompanying claims.

Reference should be had to the accompanying drawing forming a part of this specification, in which—

Figure 1 is a side elevation of an agricultural machine embodying our invention. Fig. 2 is a top plan view of the machine with certain parts omitted. Fig. 3 is an elevation with portions in section showing the driving mechanism for the disks; and Fig. 4 is a sectional elevation of a portion of the construction shown in Fig. 3.

The machine of this invention employs a chassis having side members 1 and 2 which at their forward ends are joined by a cross member 3, and there are other cross members provided at 4 and 5 which serve to join the side members of the chassis.

The power plant is generally represented at 6, and it comprises an engine preferably of the explosive type which is provided with the necessary appurtenances for its operation. The rotation of the crank shaft is transmitted through an intermediate shaft, indicated at 7, to gearing within with the casing 8, this gearing being of the change speed type, so as to permit the operation at different speeds of the instrumentalities with which it is connected.

A seat 9 for the driver of the machine is provided directly behind the power plant and adjacent are the necessary levers for the regulation of the engine, as well as for the operation of the change speed gearing and the brakes. There is also a steering wheel indicated at 10 which at its lower end is provided with a flanged wheel $11^b$ adapted to coöperate with a cable to the steering apparatus, as will later be described.

Beneath the chassis there is a sub-frame which comprises the end members 11 and 12, and the transversely extending members 13 and 14 which are joined to the members 11 and 12, thus forming a substantially rectangular frame. Upon the side members 11 and 12 are brackets carrying a journal box in which is held a shaft 15. Loose upon the shaft are rollers 16 and 17,—these rollers meeting at substantially the center of the frame and being to all intents and purposes a single cylindrical surface. These rollers serve as tractors and for this purpose are provided with diagonally arranged angular strips, such as represented at 18.

Upon the outer end of each roller section is a gear these gears being designated $16^a$ and $17^a$. These gears are provided with teeth and are adapted to be engaged by chains such as represented at 19 in Fig. 1. These chains coöperate with gears 20 and 21 which are carried upon shafts 22 and 23, the shafts at their outer ends being mounted in rear extensions of the side members 11 and 12 of the sub-frame and at their inner ends extend into a gear casing 24 in which is a differential gear mechanism, so that the shafts 22 and 23 may rotate at different relative speeds. Power is imparted to the gearing within the casing 24 by means of a chain gear drive, as represented at 25 in Fig. 1.

The side member 1 of the chassis is extended toward the rear, and the side member 12 of the sub-frame extends toward the rear in a parallel direction, the portion $12^a$ of this side member being bent upwardly, as indicated in Fig. 1; and at the rear portion is again bent to extend horizontally, as represented at $12^b$. This portion $12^b$ is joined to the side 1 of the chassis by cross members 26 and 27.

Joining the members 26 and 27 is a cross brace 28. This cross brace, together with the portion $12^b$ and the sides 26 and 27 support a bracket provided with arms, one of which is indicated at 29. These arms on meeting provide a central hub, through which extends a shaft 30. This shaft at its lower end is joined to the axle upon which the wheels 31 are mounted. The wheels 31, as will be seen from Fig. 2, have a broad flat periphery except for a central projection or ridge which cuts into the ground, and thereby prevents side slipping of the wheels 31 with respect to the ground.

To the upper end of the shaft 30 is secured a wheel 32, provided with a grooved periphery which is adapted to engage with a cable 33, which cable engages with the grooved pulley 11$^b$ at the lower end of the steering wheel. It will therefore be seen that operation of the steering wheel will produce corresponding rotation of the pulley 32, so that the wheels will be turned in the direction desired to accomplish the steering of the machine.

The side 11 of the sub-frame is extended toward the rear and is bent at an angle to provide a portion 11$^a$ thereof, as indicated in Fig. 2. Mounted upon this frame portion 11$^a$ are frame members 34, 35 and 36. These members extend diagonally with respect to the axis of the chassis, and provide framework for implements which are to work upon the ground and we therefore term this frame the implement carrying frame. The members 34 and 35 are at their rear ends joined to a cross piece 37 which is suitably joined by a brace to the side 1 of the chassis which lies directly above it. The member 36 is joined at its rear end to the member 35 by means of a brace 38, which extends between these last mentioned members. The members 35 and 36 are joined by a cross piece 39 at its front end, and the members 34 and 35 are joined by a cross piece 40 at the front end, as will be seen from an inspection of Fig. 2. Near the opposite ends of the members 34 and 35, to that just mentioned, is a brace 41 which serves as a joining means between these members.

The braces 38 and 41 are shown in Fig. 3, and comprise, as will be seen from this figure, upwardly extending portions which form journals. A description of the brace 41 and its coöperating parts will be given, it being understood that the construction of the brace 38 with its companion parts is the same. The journal formed at the upper end of this brace 41 accommodates an elongated hub 42 of a gear 43. Through the sleeve 42 there extends a shaft 44 which is provided with a spline 45, by which it is secured to the hub 42, this construction permitting relative vertical movement between the shaft and sleeve, but insuring their rotation together. At the lower portion of the brace 41 a journal is provided, as indicated at 45. Through this journaled portion extends a sleeve 46,—the shaft 44 passing through this sleeve, as will be seen from the drawing. Near its lower portion the sleeve 46, is bifurcated to form arms 47 which unite at the lower portion and provide a journal support for a tubular shaft 48. This tubular shaft in reality consists of a number of parts which are adapted to engage with disks, one of which is represented at 49,— the disk being secured between faces of adjacent sections of the hollow shaft. These sections of the hollow shaft are mounted upon a solid shaft 50 to which they are rigidly secured. The bifurcated portion of the sleeve 46 forms a suitable mounting for a gear 51 which is rigidly connected with the shaft 44. The gear 51 is provided with teeth which mesh with teeth carried by the disk 49 which is the disk adjacent to the sleeve 46. Rotation of this disk 49 causes rotation of the tubular shaft 48, and by so much causes rotation of the gang of disks which are carried upon the shaft.

The sleeve 46 is provided with teeth 46$^a$ upon its face which engage with teeth upon a pinion 52, this pinion being carried upon a shaft 53 which extends longitudinally of the implements carrying frame, as will be seen by reference to Fig. 2. Upon this shaft 53 is a worm wheel 54 which is engaged by a worm 55 carried upon a transverse shaft 56. This shaft is journaled in bearings carried by the frame members 34, 35 and 36. At one end this shaft is provided with a handle 57 by which the shaft may be operated, and through the train of mechanism described will cause the elevation and depression of the sleeve 46, this being accomplished without in any way interfering with the rotation of the shaft 44.

The mounting of the operative mechanism for the gang of disks represented at 58 in Figs. 2 and 3 is exactly the same, and further description will not be necessary, it being understood, however, that the gang of disks 58 is operated, so far as the raising and lowering thereof is concerned, entirely distinct and independently from the gang of disks which have just been described.

The gear 43 and the companion gear 59 which causes the turning of the shaft that rotates the gang of disks 58 are both in mesh with a gear 60 which is mounted upon the end of the shaft 61. This shaft extends within a gear casing 62 which at its upper end forms a journal for the shaft 61, and a seat for the gear 60. At its lower end, the gear casing provides a journal for the shaft 61 and at this portion there is mounted upon the shaft a gear 63 which coöperates with the driving mechanism of the power plant in a manner which will be presently described. This gear casing is supported upon cross members 64 which are secured to the frame members 35 and 36.

The implement carrying frame has depending therefrom a platform 65, upon which an operator may stand conveniently to operate the cranks by which the gangs of disks are raised and lowered.

Extending rearwardly from the gear case is a power shaft 66 which is provided with a flexible joint 67 at the forward end thereof, and a flexible joint 68 near the rear. This shaft extends within the gear casing 62 and is provided with a gear which meshes with the gear 63, thereby providing a flexible connection for transmission of power from the power plant to the gear 63, which through the train of mechanism previously described, causes the rotation of the two gangs of disks which are carried by the implement carrying frame.

While we have shown and described two gangs of disks, we do not wish to limit ourselves in this particular, inasmuch as one gang of disks may be used where this is desirable. In the present instance, we have shown the two gangs of disks of different diameters, the leading gang of disks being of less diameter than the following gang, it being intended that the leading gang shall cut into the soil, first taking a light cut, followed by the rear gang of disks, which will take a deeper cut, and also widen the furrow.

We do not wish to confine ourselves to the specific form of implements used for operating upon the ground, inasmuch as other forms of implements than disks may be used in this connection, without departing from the spirit of this invention.

Having thus described our invention, what we claim is:

1. In a machine of the character described, the combination with a chassis, a power producing device carried thereby, an annular traction member supporting the chassis, operative connections between the traction member and the power device, a diagonally extending frame supported by the chassis, said frame carrying devices adapted to engage the soil, and a roller supporting one end of the diagonally extending frame, a steering wheel, and operative connections between said steering wheel and roller.

2. In a machine of the character described, the combination with the chassis having a rearwardly extended side member of a power producing device carried by the chassis, a traction roller upon which the chassis is mounted, a frame in which said traction roller is mounted, said frame being secured to the chassis, a side member of said frame being rearwardly extended parallel to said rearwardly extending side member of the chassis, members joining the side members mentioned, a roller mounted between the side members mentioned and supporting the rear portion of the machine, a steering wheel, operative connections between the steering wheel and the roller, and a frame carrying devices adapted to engage the soil, said frame being connected to the traction frame and to the side members of the chassis.

3. In a machine of the character described, the combination with a chassis, of a power producing device carried thereby, an annular traction member supporting the chassis, a frame in which said traction member is mounted, one side of said frame being extended toward the rear and bent upwardly to the plane of the chassis, the side of the chassis adjacent the side of the frame just mentioned being extended to the rear, the side members mentioned being joined at their rear portions, a roller supported between the side members mentioned, a steering wheel carried by the chassis, operative connections between the steering wheel and the roller, and a frame carrying devices adapted to operate upon the soil, said frame being connected to the traction frame and to the side members of the chassis.

4. In a machine of the character described, the combination with a chassis, of a power producing device carried thereby, an annular traction member supporting the chassis, an auxiliary frame supported by the traction member, an implement frame, one end of which is supported by the auxiliary frame, the other end being supported by the chassis, and devices carried by the said implement frame which are adapted to engage the soil.

5. In a machine of the character described, the combination with a chassis, of a power producing device carried thereby, an annular traction member supporting the chassis, an auxiliary frame carried by the chassis and beneath the same, a traction roller supported in said frame, operative connections between the traction roller and the power producing device, an implement frame supported at one end by the auxiliary frame, and at the opposite end from the chassis, disks carried by said implement frame, mechanism for rotating said disks, a flexible driving connection between the said mechanism and the power producing device, and means for raising and lowering the disks.

6. In a machine of the character described, the combination with a chassis, of a power producing device carried thereby, an auxiliary frame supported from and beneath the chassis, an annular traction member mounted in the auxiliary frame, one side of said auxiliary frame being rearwardly extended, and the adjacent side of the chassis being rearwardly extended, cross members joining these two side members just mentioned, a roller mounted between the side members just mentioned, a steering wheel carried by the chassis, operative connections between the steering wheel and the roller, an implement frame supported at one end upon the auxiliary frame and at the opposite end upon the rearward extension of the chassis, and soil engaging devices carried by the implement frame.

7. In a machine of the character described, the combination with a chassis, of a power producing device carried thereby, a sub-frame connected with the chassis, an annular traction roller supporting the sub-frame, operative connections between the traction roller and power device, a frame extending rearwardly from the sub-frame and connected with the chassis, an implement frame supported by the chassis and the frame extending from the sub-frame, and a roller supporting a rear end of the frame extending from the sub-frame.

8. In a machine of the character described, the combination with a chassis, of a power producing device carried thereby, a sub-frame connected with the chassis, an annular traction member supporting the sub-frame, operative connections between the power device and traction roller, a frame extending rearwardly from the sub-frame and connected with the chassis, implements for working the soil carried at one side of the rearwardly extending frame, a steering roller supporting the rearwardly extending frame, a steering wheel carried by the chassis, and operative connections between the steering wheel and steering roller.

9. In a machine of the character described, the combination with a chassis, a power producing device carried thereby, a sub-frame connected to the chassis, a traction member supporting the sub-frame, operative connections between the traction member and power device, a frame extending rearwardly from the sub-frame and connected with the chassis, and an implement frame supported at one end from the sub-frame and at its opposite end supported from the frame extending rearwardly from the chassis.

10. In a machine of the character described, the combination with a chassis, a power producing device carried thereby, a sub-frame connected with the chassis, a traction member supporting the sub-frame, operative connections between the traction members and power device, a frame extending rearwardly from the sub-frame and connected with the chassis, an implement frame supported at one end from the chassis and at its opposite end supported from the frame extending rearwardly from the sub-frame, a roller supporting the rear end of the frame which extends rearwardly from the sub-frame, a steering wheel and operative connections between the steering wheel and roller.

In testimony whereof, we hereunto affix our signatures in the presence of two witnesses.

ROLLIN H. WHITE.
CLARENCE G. WHITE.

Witnesses for Rollin H. White:
 JESSY GRANT,
 REBECCA REISS.
Witnesses for Clarence G. White:
 LOUISE C. JONES,
 FLORENCE FISK WHITE.

Copies of this patent may be obtained for five cents each, by addressing the "Commissioner of Patents, Washington, D. C."